United States Patent
Kim et al.

(10) Patent No.: US 10,193,158 B2
(45) Date of Patent: Jan. 29, 2019

(54) ELECTROLYTIC COPPER FOIL FOR LITHIUM SECONDARY BATTERY AND LITHIUM SECONDARY BATTERY COMPRISING THE SAME

(71) Applicant: LS Mtron Ltd., Anyang-si, Gyeonggi-do (KR)

(72) Inventors: Dae-Young Kim, Yongin-si (KR); Seung-Min Kim, Osan-si (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/306,216

(22) PCT Filed: Apr. 8, 2016

(86) PCT No.: PCT/KR2016/003726
§ 371 (c)(1),
(2) Date: Oct. 24, 2016

(87) PCT Pub. No.: WO2016/208858
PCT Pub. Date: Dec. 29, 2016

(65) Prior Publication Data
US 2018/0102544 A1 Apr. 12, 2018

(30) Foreign Application Priority Data

Jun. 26, 2015 (KR) .................... 10-2015-0091274

(51) Int. Cl.
*H01M 10/052* (2010.01)
*H01M 10/0525* (2010.01)
*H01M 4/66* (2006.01)
*H01M 4/64* (2006.01)
*C22C 9/00* (2006.01)
*C22C 9/01* (2006.01)
*C22C 9/02* (2006.01)
(Continued)

(52) U.S. Cl.
CPC ............ *H01M 4/661* (2013.01); *C25D 1/04* (2013.01); *H01M 4/66* (2013.01); *H01M 10/052* (2013.01); *H01M 2004/027* (2013.01)

(58) Field of Classification Search
None
See application file for complete search history.

(56) References Cited

U.S. PATENT DOCUMENTS

| 2004/0104117 | A1 | 6/2004 | Yang et al. |
| 2007/0287020 | A1 | 12/2007 | Saito et al. |

(Continued)

FOREIGN PATENT DOCUMENTS

| JP | H09306504 | * 11/1997 | ............... C25D 1/04 |
| KR | 10-2003-0036415 A | 5/2003 | |

(Continued)

OTHER PUBLICATIONS

English translation of JPH09306504 (1997).*
(Continued)

*Primary Examiner* — Yoshitoshi Takeuchi
(74) *Attorney, Agent, or Firm* — K&L Gates LLP

(57) ABSTRACT

An electrolytic copper foil for a lithium secondary battery has yield strength of 30 kgf/mm$^2$ to 60 kgf/mm$^2$, a surface area ratio of 1 to 3, and a weight deviation of 3% or below.

5 Claims, 1 Drawing Sheet

(51) Int. Cl.
*C22C 9/04* (2006.01)
*C22C 9/05* (2006.01)
*C22C 9/06* (2006.01)
*C22C 9/08* (2006.01)
*C22C 9/10* (2006.01)
*C25D 1/04* (2006.01)
*H01M 4/02* (2006.01)

(56) References Cited

U.S. PATENT DOCUMENTS

| | | |
|---|---|---|
| 2009/0166213 A1 | 7/2009 | Dobashi et al. |
| 2010/0136434 A1 | 6/2010 | Hanafusa |
| 2012/0015206 A1* | 1/2012 | Kim ................ B32B 15/01 428/606 |
| 2014/0017564 A1 | 1/2014 | Suzuki |
| 2014/0045061 A1 | 2/2014 | Suzuki |
| 2014/0199588 A1 | 7/2014 | Shinozaki |

FOREIGN PATENT DOCUMENTS

| | | |
|---|---|---|
| KR | 10-2007-0117465 A | 12/2007 |
| KR | 10-2008-0064884 A | 7/2008 |
| KR | 10-2013-0102849 A | 9/2013 |
| KR | 101502373 B1 | 3/2015 |

OTHER PUBLICATIONS

Search Report for International Application No. PCT/KR2016/003726.

Committee E28; "Standard Test Methods for 1 Tension Testing of Metallic Materials"; Aug. 2013; (28 pages).

Extended European Search Report for related European Application No. 168145712; report dated Dec. 11, 2018; (10 pages).

\* cited by examiner

ELECTROLYTIC COPPER FOIL FOR LITHIUM SECONDARY BATTERY AND LITHIUM SECONDARY BATTERY COMPRISING THE SAME

TECHNICAL FIELD

The present application is a National Stage of International Application No. PCT/KR2016/003726, filed on Apr. 8, 2016, which claims priority to Korean Patent Application No. 10-2015-0091274 filed on Jun. 26, 2015 in the Republic of Korea, the entire contents of each of which are incorporated herein by reference.

The present disclosure relates to an electrolytic copper foil for a lithium secondary battery and a lithium secondary battery comprising the same, and more particularly, to an electrolytic copper foil for a lithium secondary battery and a lithium secondary battery comprising the same, which has improved properties by limiting yield strength, a surface area ratio and a weight deviation within predetermined ranges.

BACKGROUND ART

A lithium secondary battery has many advantages such as relatively high energy density, high operation voltage, excellent preservation and long life span in comparison to other secondary batteries, and thus the lithium secondary battery is widely used for various portable electronic devices such as personal computers, camcorders, cellular phones, CD players, PDA or the like.

Generally, a lithium secondary battery includes a positive electrode and a negative electrode disposed with an electrolyte being interposed between them. Here, the positive electrode is configured so that a positive electrode active material is attached to a positive electrode current collector, and the negative electrode is configured so that a negative electrode active material is attached to a negative electrode current collector.

In the lithium secondary battery, the negative electrode current collector is generally made of an electrolytic copper foil. In this case, if equipment conditions are not controlled strictly, many machine direction (MD) buckles occur.

The MD buckles mean a defect of an uneven shape, generated in a MD direction appearing at a copper foil rolled after a foil preparing process.

The MD buckles may cause take-back from customers when products are delivered, and may also cause coating deviation and active material separation when an active material is coated.

It is known that among causes of MD buckles which have been revealed so far, material causes have a relation with a weight deviation. However, in case of the copper foil, even though the weight deviation is strictly controlled, MD buckles are greatly generated, and thus a scheme to solve this problem is demanded.

DISCLOSURE

Technical Problem

The present disclosure is designed to solve the problems of the related art, and therefore the present disclosure is directed to providing an electrolytic copper foil for a lithium secondary battery, which may have excellent properties by controlling various factors of a copper foil.

However, the technical objects to be accomplished by the present disclosure are not limited to the above, and other objects not mentioned above may be clearly understood from the following detailed description.

Technical Solution

The inventors of the present disclosure have studied to solve the above technical problem, and as a result obtained an electrolytic copper foil for a lithium secondary battery, which has excellent properties in view of MD buckles by appropriately controlling yield strength, a surface area ratio and a weight deviation within predetermined ranges.

The electrolytic copper foil for a lithium secondary battery having excellent properties according to an embodiment of the present disclosure is an electrolytic copper foil for a lithium secondary battery, which is applied as a negative electrode current collector of a lithium secondary battery, wherein the electrolytic copper foil has yield strength of 30 $kgf/mm^2$ to 60 $kgf/mm^2$, a surface area ratio of 1 to 3, and a weight deviation of 3% or below.

Meanwhile, the electrolytic copper foil for a lithium secondary battery may have a surface roughness of 0.2 μm to 2 μm on the basis of Rz.

The electrolytic copper foil for a lithium secondary battery may have an elongation of 3% or above.

The electrolytic copper foil for a lithium secondary battery may have a thickness of 3 μm to 30 μm.

Meanwhile, a lithium secondary battery according to an embodiment of the present disclosure is manufactured by applying the electrolytic copper foil for a lithium secondary battery, described above, as a negative electrode current collector.

In addition, a method for manufacturing an electrolytic copper foil for a lithium secondary battery according to an embodiment of the present disclosure is a method for manufacturing an electrolytic copper foil for a lithium secondary battery which has yield strength of 30 $kgf/mm^2$ to 60 $kgf/mm^2$, a surface area ratio of 1 to 3, and a weight deviation of 3% or below, the method comprising (a) preparing a copper sulphate solution; (b) adding 0.1 ppm to 3 ppm of thiourea-based compound, less than 5 ppm of chlorine, and 50 ppm or below of TOC to the copper sulphate solution; and (c) electroplating a copper foil on a drum with a current density of 10 ASD to 80 ASD so that a weight deviation is controlled to be less than 3?.

Advantageous Effects

In an embodiment of the present disclosure, it is possible to obtain an electrolytic copper foil for a lithium secondary battery, at which MD buckles do not occur, and thus it is possible to improve the performance of a lithium secondary battery, which is manufactured using the electrolytic copper foil for a lithium secondary battery.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an electrolytic copper foil for a lithium secondary battery according to an embodiment of the present disclosure will be described with reference to FIG. 1.

Figure 1:
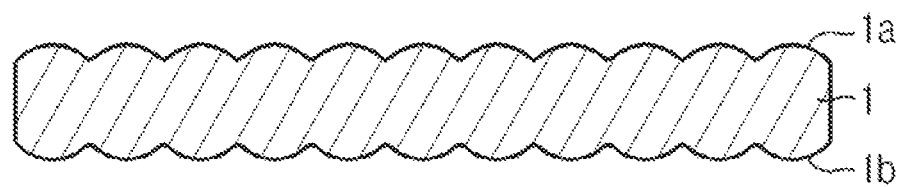
FIG. 1 is a cross-sectional view showing an electrolytic copper foil for a lithium secondary battery according to an embodiment of the present disclosure.

FIG. 1 is a cross-sectional view showing an electrolytic copper foil for a lithium secondary battery according to an embodiment of the present disclosure.

The electrolytic copper foil 1 for a lithium secondary battery according to an embodiment of the present disclosure, shown in FIG. 1, may be used as a negative electrode current collector of a lithium secondary battery. In other words, in the lithium secondary battery, the negative electrode current collector coupled to a negative electrode active material may employ the electrolytic copper foil.

Meanwhile, when manufacturing a lithium secondary battery, a positive electrode current collector coupled to a positive electrode active material generally employs a foil made of aluminum (Al).

Accordingly, the present disclosure is based on a case where the electrolytic copper foil 1 for a lithium secondary battery corresponds to a negative electrode current collector applied to the lithium secondary battery.

The electrolytic copper foil 1 for a lithium secondary battery limits yield strength, a surface area ratio and a weight deviation within predetermine ranges during a manufacturing process, in order to prevent any inferiority from being generated by coating deviation and active material separation due to MD buckles (defects of an uneven shape generated in a machine direction (MD) appearing at a copper foil after a foil preparing process.

The electrolytic copper foil 1 for a lithium secondary battery is manufactured using an apparatus for electrolytic deposition which includes a rotating drum and a positive electrode plate located at a predetermined interval from the drum, in an electrolytic bath.

In the copper foil preparing process using such an apparatus for electrolytic deposition, an amount of additives put into a plating solution (an electrolytic solution) may be adjusted within a predetermined range to control yield strength and a surface area ratio of the electrolytic copper foil, and when a copper foil is electroplated on the drum, a shielding plate or an auxiliary positive electrode may be installed at a region deviating from the core to control the weight deviation within a predetermined range.

In the present disclosure, the amount of additives put into the plating solution (the electrolytic solution) is adjusted so that a thiourea-based compound has a concentration of 0.1 ppm to 3 ppm, chlorine has a concentration of less than 5 ppm, and total organic carbon (TOC) has a concentration of 50 ppm or below. By manufacturing an electrolytic copper foil with a controlled amount of additives, it is possible to obtain an electrolytic copper foil having yield strength of 30 kgf/mm$^2$ or above and 60 kgf/mm$^2$ or below and a surface area ratio (actually measured surface area/unit area for measurement) of 1 or above and 3 or below.

Meanwhile, in the present disclosure, the weight deviation may be controlled to be 3% or below.

The electrolytic copper foil 1 for a lithium secondary battery according to an embodiment of the present disclosure at which the yield strength, the surface area ratio and the weight deviation are limited within predetermined ranges may prevent the generation of MD buckles and thus prevent any inferiority from being caused due to coating deviation or active material separation when the active material is being coated.

If the electrolytic copper foil 1 for a lithium secondary battery has yield strength of less than 30 kgf/mm$^2$, when the electrolytic copper foil is rolled, MD buckles may be generated more and more due to plastic deformation. If the yield strength is greater than 60 kgf/mm$^2$, there is no generation of MD buckles, but the electrolytic copper foil may not be used as a commercial copper foil due to strong brittleness.

In addition, if the electrolytic copper foil 1 for a lithium secondary battery has a surface area ratio (actually measured surface area/unit area for measurement) of less than 1, an air layer may be introduced due to slip phenomenon between the active material and a surface 1a of the electrolytic copper foil, which may generate more MD buckles. If the surface area ratio is greater than 3, MID buckles may be generated more and more due to air trapping. Here, the air trapping means that an air layer is introduced between copper foil layers during the copper foil rolling process due to surface characteristics of the copper foil or equipment conditions.

Meanwhile, if the electrolytic copper foil 1 for a lithium secondary battery has a weight deviation of more than 3%, MD buckles may be generated more and more due to air trapping, similar to the above case where the surface area ratio is greater than 3.

It will be described later in detail whether MD buckles or tear of the electrolytic copper foil is generated or not, depending on the yield strength, the surface area ratio and the weight deviation, with reference to experimental examples and comparative examples.

Meanwhile, the electrolytic copper foil 1 for a lithium secondary battery may have surface roughness of about 0.2 μm to 2 μm, on the basis of Rz (ten-point average roughness).

If the surface roughness is less than about 0.2 μm, the adhesion between the electrolytic copper foil and the active material may deteriorate. If the adhesion between the electrolytic copper foil and the active material deteriorates as above, the active material is more likely to be separated while the lithium secondary battery is in use.

If the surface roughness is greater than about 2 μm, active material may not be uniformly coated on the surface 1a of the electrolytic copper foil due to high roughness. In the active material is not uniformly coated as above, the manufactured lithium secondary battery may have a deteriorated discharge capacity retention rate.

In addition, the electrolytic copper foil 1 for a lithium secondary battery may have an elongation of about 3% or above.

If the electrolytic copper foil has an elongation of less than about 3%, when the lithium secondary battery cell is assembled, a current collector to which the electrolytic copper foil is applied may be highly likely to be fractured.

The electrolytic copper foil 1 for a lithium secondary battery may have a thickness of about 3 μm to 30 μm.

If the electrolytic copper foil has a thickness of less than about 3 μm which is too small, during a battery manufacturing process, the electrolytic copper foil may not be easily handled. If the electrolytic copper foil has a thickness greater than about 30 μm, when the electrolytic copper foil is used as a current collector, the volume of the current collector may increase due to the thickness, which makes it difficult to manufacture a high-capacity battery.

Figure 2:
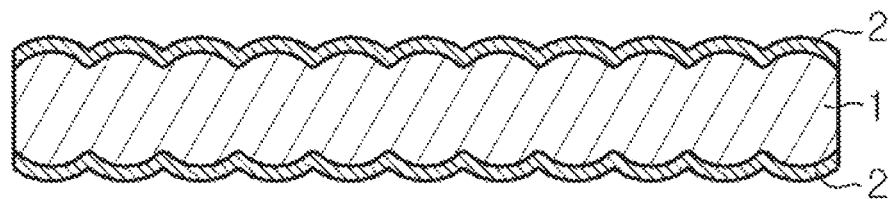
FIG. 2 is a cross-sectional view showing a coating layer formed at a surface of the electrolytic copper foil for a lithium secondary battery according to an embodiment of the present disclosure.

Meanwhile, referring to FIG. 2, the electrolytic copper foil 1 for a lithium secondary battery according to an embodiment of the present disclosure may further include a protection layer 2 formed on the surface 1a thereof.

The protection layer 2 is selectively formed on the surface 1a of the electrolytic copper foil for the corrosion control of the electrolytic copper foil 1 for a lithium secondary battery, and may be made of at least one selected from the group consisting of chromate, benzotriazole (BTA) and a silane coupling agent.

The protection layer 2 may also play a role of giving heat resistance and/or enhanced coupling with the active material to the electrolytic copper foil 1 for a lithium secondary battery, in addition to the corrosion control.

MODE FOR DISCLOSURE

Next, with reference to Table 1 below, a method for manufacturing an electrolytic copper foil for a lithium secondary according to an embodiment of the present disclosure and manufacture conditions of an electrolytic copper foil for a lithium secondary battery according to examples and comparative examples will be described.

Manufacturing Process

A copper foil was prepared using an apparatus for electrolytic deposition including a rotating drum and a positive electrode plate located at a predetermined interval from the drum, in an electrolytic bath. Copper sulphate was used as an electrolytic solution for electroplating, and a thiourea-based compound containing thiourea (TU), chlorine (Cl) and TOC was used as an additive put into the copper sulphate. Concentration of each component contained in the thiourea-based compound was controlled so that thiourea has a concentration of 0.1 ppm to 3 ppm, chlorine has a concentration of less than 5 ppm, and TOC has a concentration of less than 50 ppm.

A raw copper foil (i.e, a copper foil without surface treatment) was electroplated on the drum with a current density of 10 ASD to 80 ASD. At this time, the weight deviation was controlled by installing a shielding plate or an auxiliary positive electrode at a region deviating from core.

Manufacture Conditions of Examples and Comparative Examples

In both Examples and Comparative Examples, an electrolytic bath including a drum with a width of 1,400 mm was used, and an electrolytic copper foil having a thickness of 8 μm was prepared according to manufacture conditions shown in Table 1 below, under the conditions of 70 g/L of copper (Cu), 80 g/L of sulfuric acid, an electrolytic solution temperature of 55° C., and a current density of 55 A/dm².

In addition, the prepared electrolytic copper foil was rolled with a length of 3,000 m, and then it was checked whether MD buckles occurred.

Measurement Method (1). Yield strength was measured using a universal testing machine (UTM), and a gauge length was 5 cm. At this time, a crosshead speed was set to be 50 mm/min, and a sample used for the measurement was cut into a width of 12.7 mm.

(2). Surface area ratio was measured using a 3D laser scanning microscope (VK-X100), produced by Kyence.

Here, the surface area ratio corresponds to a value obtained by dividing an actual surface area three-dimensionally measured with respect to a measurement surface by a unit measurement area. In addition, the actual surface area is an area obtained by three-dimensionally measuring a measurement region of a first surface 1a of a copper foil sample with a 3D microscope, namely an area obtained by moving a lens of the 3D microscope in a Z-axis direction to shift a focus. In other words, the surface area ratio corresponds to a ratio of an actual surface area of the exposed surface in comparison to a unit measurement area.)

(3). Weight deviation is defined as [(maximum weight−minimum weight)/(average weight)×100] by cutting L (left), R (right) and C (center) three portions by 10 cm×10 cm.

TABLE 1

|  | Thiourea (TU) | Chlorine (Cl) | TOC | SPS | Gelatin | HEC | Note |
|---|---|---|---|---|---|---|---|
| Example 1 | 0.5 | 3 | 38 | — | — | — |  |
| Example 2 | 3 | 3 | 42 | — | — | — |  |
| Example 3 | 1.5 | 3 | 43 | — | — | — |  |
| Example 4 | 1 | 3 | 42 | — | — | — |  |
| Comparative Example 1 | — | — | 45 | 2 | 2 | 2 |  |
| Comparative Example 2 | 4 | 3 | 44 | — | — | — |  |
| Comparative Example 3 | 0.5 | 3 | 43 | 2 | 2 | 2 |  |
| Comparative Example 4 | 1.5 | 3 | 75 |  |  |  |  |
| Comparative Example 5 | 1.5 | 8 | 42 | — | — | — |  |
| Comparative Example 6 | 1.5 | 3 | 41 | — | — | — | No shielding |

** Unit of concentration of additives: ppm

Meanwhile, referring to Table 2 below, properties of the electrolytic copper foils according to Examples 1 to 4 of Table 1 and properties of the electrolytic copper foils according to Comparative Examples 1 to 6 are shown, and also it is shown whether MD buckles occur or not, in each of Examples and Comparative Examples.

TABLE 2

|  | Yield strength [Kgf/mm$^2$] | Surface area ratio | Weight deviation [%] | MD line |
|---|---|---|---|---|
| Example 1 | 33 | 2.5 | 2.8 | X |
| Example 2 | 58 | 1.3 | 1.5 | X |
| Example 3 | 50 | 1.5 | 2.2 | X |
| Example 4 | 40 | 1.8 | 2.5 | X |
| Comparative Example 1 | 27 | 1.4 | 2.4 | ◯ |
| Comparative Example 2 | 62 | 1.2 | 2.6 | X [torn] |
| Comparative Example 3 | 32 | 0.9 | 2.8 | ◯ |
| Comparative Example 4 | 41 | 3.1 | 2.7 | ◯ |
| Comparative Example 5 | 42 | 3.4 | 2.6 | ◯ |
| Comparative Example 6 | 40 | 1.8 | 3.4 | ◯ |

If Example 1 and Comparative Example 1 in Table 2 are compared from each other, it may be found that MD buckles occur when the electrolytic copper foil has yield strength of less than 30 kgf/mm$^2$. Similarly, if Example 2 and Comparative Example 2 are compared with each other, it may be found that MD buckles do not occur when the electrolytic copper foil has yield strength of greater than 60 kgf/mm$^2$, but the electrolytic copper foil is torn while the electrolytic copper foil is being rolled.

Next, if Example 2 and Comparative Example 3 in Table 2 are compared from each other, it may be found that MD buckles occur when the electrolytic copper foil has a surface area ratio of less than 1. Similarly, if Example 1 and Comparative Examples 4 and 5 are compared from each other, it may be found that MD buckles occur when the electrolytic copper foil has a surface area ratio of greater than 3.

In addition, if Examples 1 and 4 and Comparative Example 6 are compared from each other, it may be found that MD buckles occur when the electrolytic copper foil has a weight deviation of greater than 3%.

Therefore, if the above results are synthetically put into consideration, it may be understood that if the electrolytic copper foil for a lithium secondary battery has yield strength of 30 kgf/mm$^2$ to 60 kgf/mm$^2$, a surface area ratio of 1 to 3, and a weight deviation of 3% or below, it is possible to obtain a high-quality electrolytic copper foil for a lithium secondary battery at which MD buckles do not occur and the copper foil is not torn during a rolling process.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure provides an electrolytic copper foil for a lithium secondary battery, which is used for a negative electrode current collector applied to a lithium secondary battery, and a lithium secondary battery comprising the same.

What is claimed is:

1. An electrolytic copper foil for a lithium secondary battery, which is applied as a negative electrode current collector of a lithium secondary battery,
    wherein the electrolytic copper foil for a lithium secondary battery has yield strength of 30 kgf/mm$^2$ to 60 kgf/mm$^2$, a surface area ratio of 1 to 3, and a weight deviation of 3% or below.

2. The electrolytic copper foil for a lithium secondary battery according to claim 1,
    wherein the electrolytic copper foil for a lithium secondary battery has a surface roughness of 0.2 μm to 2 μm on the basis of Rz.

3. The electrolytic copper foil for a lithium secondary battery according to claim 1,
    wherein the electrolytic copper foil for a lithium secondary battery has an elongation of 3% or above.

4. The electrolytic copper foil for a lithium secondary battery according to claim 1,
    wherein the electrolytic copper foil for a lithium secondary battery has a thickness of 3 μm to 30 μm.

5. A lithium secondary battery, in which the electrolytic copper foil for a lithium secondary battery according to claim 1 is applied as a negative electrode current collector.

* * * * *